Aug. 14, 1934.    J. BAILEY    1,970,354
MEANS FOR FEEDING MOLTEN GLASS
Filed Jan. 30, 1932    4 Sheets-Sheet 1
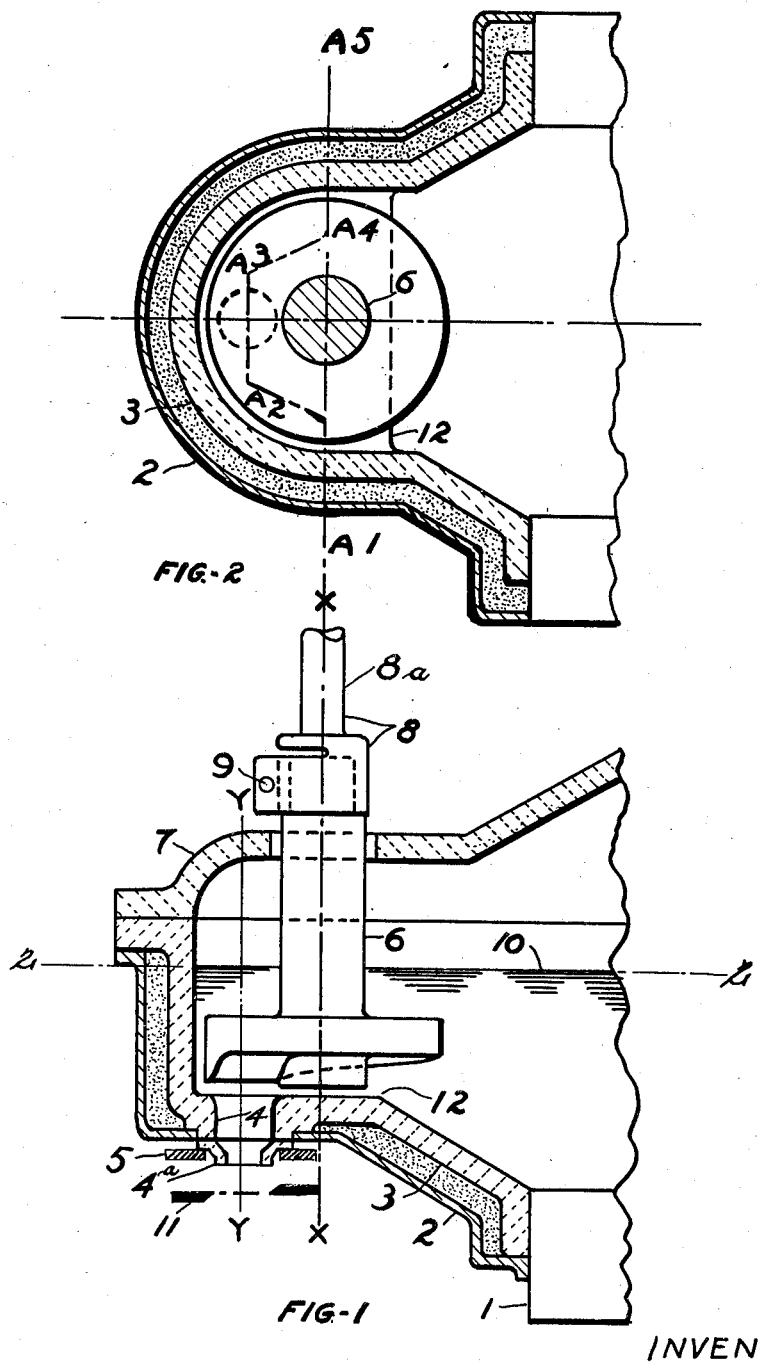
INVENTOR
James Bailey

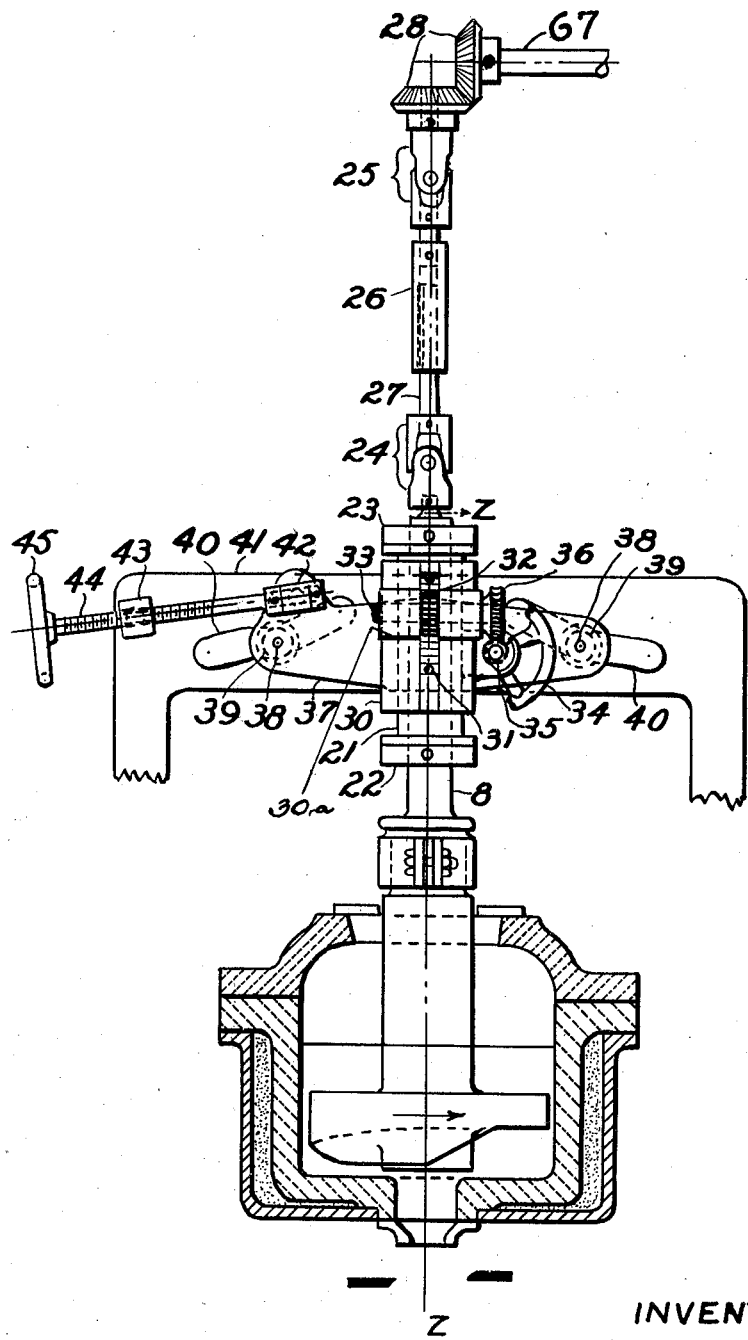

Aug. 14, 1934.   J. BAILEY   1,970,354
MEANS FOR FEEDING MOLTEN GLASS
Filed Jan. 30, 1932    4 Sheets-Sheet 3

INVENTOR
James Bailey

Aug. 14, 1934.    J. BAILEY    1,970,354
MEANS FOR FEEDING MOLTEN GLASS
Filed Jan. 30, 1932    4 Sheets-Sheet 4
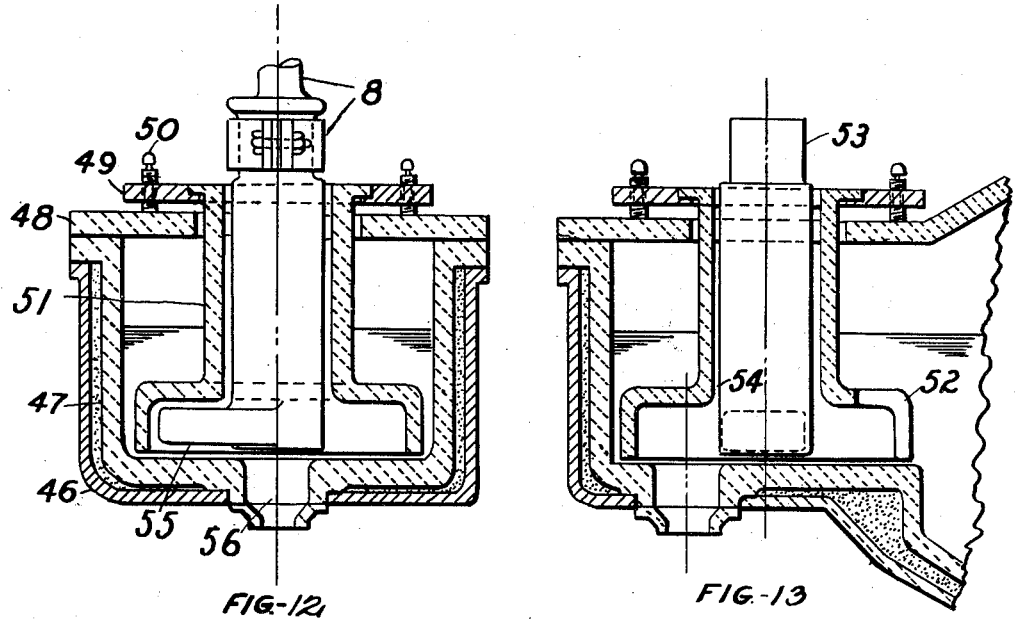
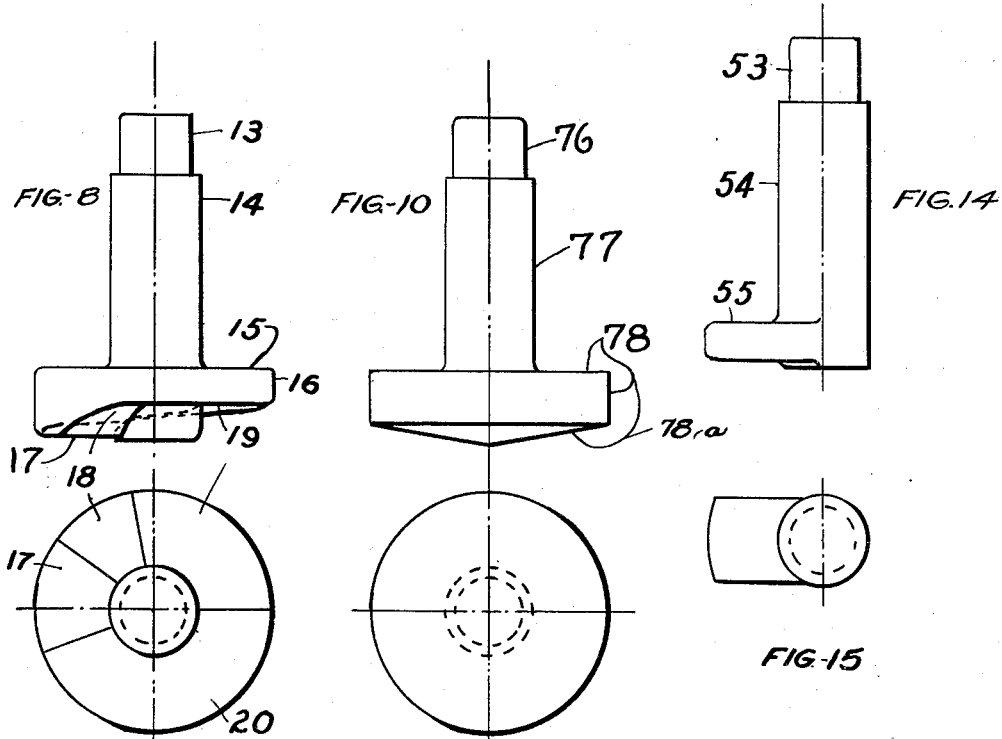
INVENTOR
James Bailey Patented Aug. 14, 1934

1,970,354

UNITED STATES PATENT OFFICE 1,970,354

MEANS FOR FEEDING MOLTEN GLASS

James Bailey, Hamburg, N. Y., assignor to Hartford-Empire Company, Hartford, Conn., a corporation of Delaware Application January 30, 1932, Serial No. 589,886

38 Claims. (Cl. 49—55)

My invention relates to the art of feeding and delivering measured charges of molten glass and aims generally to improve existing methods and apparatus therefor.

Existing glass feeding devices now in use may be generally divided into two classes; one, in which the glass charges are expelled through an orifice by the alternate application of pressure air and suction above the charge and; two, by causing a pulsating stream of glass to issue from the orifice by means of a cylindrical plunger or needle mounted for movement in the glass to assist in the extrusion of the stream from the orifice.

According to my invention the operation of the feeding device makes use of and depends for its action upon positive and negative pressure created in a viscous fluid by the relative motion of two adjacent surfaces submerged in and therefore in contact with the fluid. The impeller preferably rotates around an axis and may be continuously submerged in the glass and hence does not change its relation with respect to the glass level.

In order that my invention may be better understood, reference is had to the accompanying drawings as illustrating an embodiment thereof and in which Fig. 1 is a fragmentary vertical longitudinal sectional view of a portion of a glass forehearth or bowl with one form of impeller according to my invention being shown in operative position therein;

Fig. 2 is a horizontal sectional view taken on approximately the line of the glass level of Fig. 1;

Fig. 3 is an elevational view of the feeding device and a portion of the operating mechanism therefor, the bowl being shown in section as taken on the line A', A$^2$, A$^3$, A$^4$, A$^5$, of Fig. 2;

Fig. 8 is a side elevation of the impeller shown in Figs. 1, 2, and 3;

Fig. 9 is a bottom plan view thereof;

Fig. 10 is a side elevation of the impeller shown in Figs. 6 and 7;

Fig. 11 is a bottom plan view thereof;

Fig. 12 shows a modified form of glass feeding device, the forehearth or bowl being shown in vertical transverse section;

Fig. 13 is a similar view of the device shown in Fig. 12, the forehearth or bowl being shown in vertical longitudinal section;

Fig. 14 is a side elevation of the form of impeller shown in Figs. 12 and 13; and Fig. 15 is a bottom plan view thereof.

Figure 4:
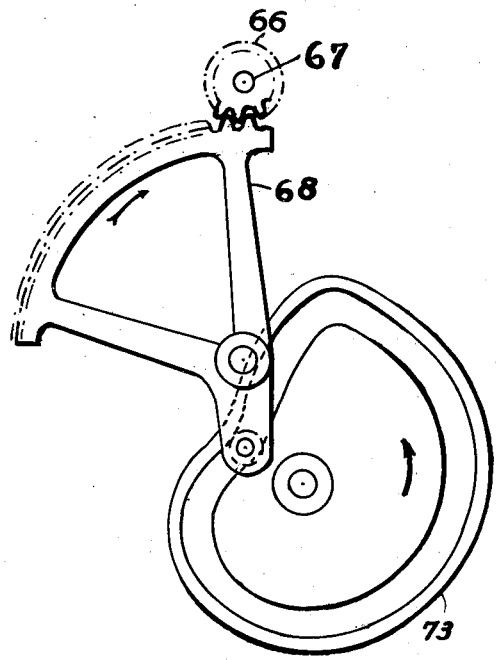
Fig. 4 is a detailed elevational view of a portion of the operating mechanism.

In the accompanying drawings I have endeavored to show sufficiently for purposes of illustration to those skilled in the art, the manner in which my improved feeder is constructed and may be operated in a forehearth of the conventional, glass melting tank, certain parts of the mechanism necessary to the complete structure having been omitted, these being common and well known to those skilled in the art. For example, it may be necessary and advantageous to supply heat to the bowl or forehearth by suitable means such as gas or oil burners. Furthermore, the bearings of the driving mechanism, the frame for constraining the moving parts, and the structure necessary to hold the equipment to the furnace have been omitted. These will depend upon the location in which the devices are to be used and obviously will vary to suit the particular installation made.

In the embodiment of the invention illustrated in Figs. 1 to 11, the glass melting tank 1 may be of usual construction and design for melting and confining a supply of molten glass and is connected to the usual cast iron shell 2 containing the bowl 3 commonly construed as the forehearth of the tank. The space between the shell and the bowl is preferably packed with suitable insulation to conserve the heat, the bowl or forehearth is provided with the usual orifice 4 which may have a removable section 4a so that its effective diameter can be adjusted to suit conditions of use, it being well known that certain shapes of charges are required for certain designs of ware. A metal retaining ring 5 is advantageously provided to secure the orifice ring 4a in position. The axis of the orifice in the forehearth or bowl is represented by the line y—y in Fig. 1.

Located within the bowl and with its axis disposed or offset from the axis y—y as at x—x is an impeller or runner 6 which may advantageously be supported by a clamp 8 on the lower end of a shaft 8a, the latter being constrained in suitable bearings (see Fig. 3) and capable of adjustment vertically and angularly with respect to the axis y—y as will hereinafter appear. Below the orifice is located a pair of shears 11 for cutting a pulsating stream into separate gobs. These shears may be of conventional design and may be operated by air or mechanical means as desired and are preferably timed to the drive in such a manner that one cut is made for each extrusion of the glass. The glass level in the forehearth or bowl is indicated by the reference numeral 10.

Advantageously the bottom of the bowl is sloped downwardly toward the tank from the line 12 which passes across the bottom of the bowl at a distance beyond the center of the runner or impeller approximately equal the distance between the center of the orifice and the center of the impeller. I have found that this construction reduces the power required for satisfactory operation and enhances the operation of the type of impeller shown although it is not necessary to the satisfactory operation of the machine.

One design of runner or impeller suitable for this type of bowl is shown in Figs. 1, 2, 3, 8, and 9. It consists of a finished upper end 13 ground to fit the interior of the clamp 8, a cylindrical portion or stem 14 and the lower disk end section 15. The upper surface of this section 15 is preferably a plain surface devoid of irregular projections and contour such as might effect objectionable agitation of the glass above the impeller. The side surface 16 preferably is cylindrical and of a proper diameter to give sufficient space between it and the wall of the bowl, the arrangement being such that a relatively narrow space exists between the periphery of the impeller and the side wall of the bowl, so as to confine the glass below the impeller and prevent the leakage of pressure exerted on the glass by the under surface of the impeller. The lower surface of the disk section 15 consists essentially of four regions. A region 17 which is disposed downwardly the greatest distance from the surface 15, a helical upwardly sloping surface 18 on a relatively steep angle connecting the surface 17 with the upper flat surface 19 and a reverse helical surface 20 adjoining the surfaces 17 and 19 on the other side of the impeller. Although I have elected to divide the lower surface of the runner or impeller in the above described manner, it is to be understood that these surfaces may be blended or alternated or duplicated without departing from the spirit of the disclosure. The steepness of the angles which the surfaces 18 and 20 make with the bottom of the bowl modify the degree of extrusion and retraction as will be apparent.

In the case of using a runner or impeller as above described, it will be found advantageous to impart to the impeller a continuous uniform rotation. It is well known that when relative motion exists between two parallel surfaces separated by a viscous fluid, a force is required to maintain the motion, which force is proportional to the relative velocity and inversely proportional to the distance separating the surfaces. When the circular disk portion 15 of the impeller is rotated or caused to revolve above the bottom of the bowl and about an axis at right angles to the bottom of the bowl, no pressure will be developed in the glass or liquid between the plain surface 19 of the impeller and the bottom of the bowl. There is, however, a positive pressure exerted in the glass between the runner and the bottom of the bowl below the advancing surface 18 or 20 according to the direction of rotation and as this surface passes over the orifice the pressure has the effect of extruding the glass through the orifice. As the depending portion 17 of the impeller passes over the orifice, the pressure falls to zero and becomes negative when the following inclined surface passes over the orifice which has an effect of retracting the glass back into the orifice and bowl where the tip may be reheated by contact with the main body of glass.

Figure 6:
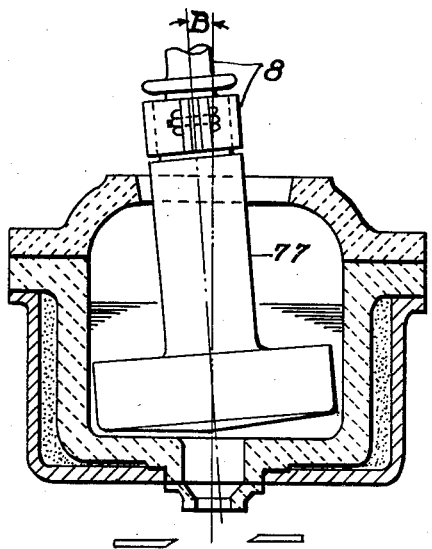
Fig. 6 is a detailed sectional view illustrating another form of impeller that may be optionally used in place of the impeller shown in Figs. 1, 2, and 3.
Figure 7:
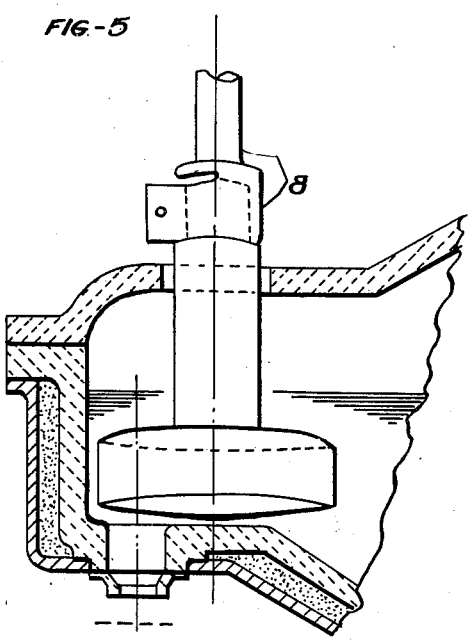
Fig. 7 is a side elevation thereof, the portion of the bowl being shown in vertical section.

According to another embodiment of my invention, a slightly different type of impeller may be used, which comprises a round upper end portion 76 shaped accurately to fit the clamp 8, the central stem portion 77 and a lower disk shaped end portion 78 having a conical bottom face 78a as shown in Figs. 6, 7, and 10. If such an impeller is mounted in a forehearth or bowl of a glass tank with its axis inclined with respect to the vertical axis or axes of the orifice as shown in Figs. 6 and 7 and an oscillating rotation imparted to the impeller, a positive pressure will be exerted upon the charge of glass to extrude it through the orifice during one direction of rotation of the impeller and a negative pressure will be created in the glass during the opposite direction of rotation. The period of oscillation as well as the speed controls largely the shape of the charge extruded through said orifice and may obviously be further modified to suit desired conditions by the angular adjustment of the impeller. Obviously the weight of the charge delivered from the forehearth by the feeding device may be varied by the vertical adjustment of the impeller from the bottom of the bowl or forehearth thereby varying the amount of glass between the lower face of the impeller and the bottom of the bowl.

Suitable mechanism is advantageously provided to impart a uniform rotation to the impeller if the type of impeller shown in Figs. 1, 2, 3, 8, and 9 is used or to impart oscillating movement to the impeller when the form of impeller shown in Figs. 6, 7, 10, and 11 is used, and advantageously this driving mechanism is such as to produce a variety of speeds and motions to the impeller so that a wide range of shapes of glass charges may be delivered.

It is advantageous to provide means for operating the impeller, and/or imparting thereto a rotative movement which may be varied or controlled throughout a wide range from a continuous uniform rotation to an oscillating rotative movement, including a pulsating non-uniform continuous rotation or a vibratory oscillating continuous rotation. Accordingly my invention includes means for operating the impeller throughout such a wide range of movement.

According to one embodiment of my invention the shaft 8a which carries the clamp 8 and supports the impeller is adjustably mounted in a sleeve bearing 21, being constrained against endwise movement by the collars 22 and 23. At its upper end, the shaft is connected by a universal joint 24 to a splined shaft 27 telescoping in a sliding sleeve 26 adapted to be driven through universal joint 25 from the shaft 67 through the bevel gears 28 (see Fig. 3).

The bearing 21 is advantageously slidably mounted in a retaining member 30 which may be provided with bearings 30a in which is journaled a shaft 33 carrying a pinion 32 meshing with a rack 31 on the sleeve 21 whereby vertical adjustment of the sleeve shaft 8 and impeller may be effected. Adjustment of the impeller vertically may be facilitated by means of a worm wheel 36 on the end of the shaft 33 meshing with a worm 35 and adapted to be rotated by a hand wheel 34 or other suitable adjusting device as will be apparent. The retaining member 30 may advantageously be provided with ears 37 or the like, which carry near their extremities pins 38 on which are mounted rollers 39 adapted to slide in cam shaped slots 40 in a frame member 41 which may be suitably mounted above the forehearth. Adjustment of the rollers 39 in the slots 40 may be effected advantageously by means of an adjusting member comprising a swivel bearing 42 on the end of a threaded stem 44 and having threaded engagement with a pivoted nut 43 pivotally mounted on the frame. Adjustment of the shaft 44 may be conveniently accomplished by a movement of the hand wheel 45 so as to thread the shaft inwardly and outwardly through the nut 43 and adjust the position of the rollers in the slot 40 and thereby vary the angular position of the axis of the impeller with respect to the vertical. This adjustment is particularly advantageous in connection with the use of the impeller shown in Figs. 6, 7, 10, and 11 although obviously it facilitates the accurate positioning of the impeller shown in the other figures and therefore aids in its operation.

As stated above, various designs of impellers will give satisfactory action for certain cases when the impeller is uniformly rotated. I have found, however, that in some cases better results are obtained if the angular velocity of the impeller is not uniform. Thus the rate of extrusion is increased if the velocity of the impeller is greater when the nose thereof is moving toward the orifice and its degree and duration may be altered by changing the angular velocity in the desired manner. For such operation it may be desirable to impart a pulsating continuous rotation to the impeller.

Figure 5:
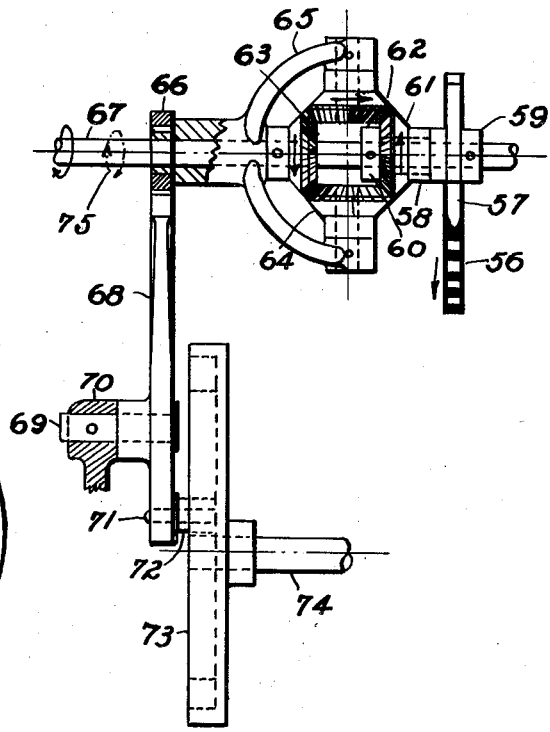
Fig. 5 is a side elevation thereof, parts being shown in section for purpose of better illustration.

One means of accomplishing both of these results and obtaining a wide range of adjustment in the angular velocity of the impeller is shown in Figs. 4 and 5 as constituting a suitable driving mechanism for the feeder. The drive chain 56 (see Fig. 5) is connected to some suitable source of power such as a variable speed motor provided with suitable reducing gearing (not shown) so that the sprocket 57 may be uniformly driven at the desired speed. The sprocket 57 may be mounted on the hub of a bevel gear 61, both of which are loose and free to revolve on the shaft 67. Collars 59 and 60 are provided to prevent endwise movement of the assembly of sprocket 57 and gear 61 on the shaft 67.

When the sprocket 57 and gear 61 are driven, a drive is imparted to the shaft 67 by means of bevel gears 62 and 64 carried on the opposite arms of a yoke 65 having connected therewith a pinion 66. The gears 62 and 64 mesh with the bevel pinion 63 which is pinned to the shaft 67. The yoke 65 containing suitable bearings holds the gears 62 and 64 in the proper mechanical relation to the other parts. When the yoke 65 is prevented from revolving around the shaft and a uniform speed of rotation is imparted to the sprocket 57 and gear 61, a similar uniform rotation of opposite direction will be transmitted to the gear 63 and shaft 67 (see Fig. 5) to drive the sleeve 26 and shaft 27 and the impeller shaft 8 at a uniform speed. If it is desired to vary the angular velocity of the impeller, the shaft 67 may be driven through the pinion 66 fast to the yoke 65 by means of an oscillating gear segment 68 journaled on the stub shaft 69 supported in bearing sprockets 70 and carrying a roller 72 on pin 71 working in cam slot of cam 73 supported on the shaft 74. The shaft 74 is obviously driven from the reducing gearing coupled with a variable speed motor (not shown) and is timed to revolve once for each cycle of expulsion and retraction of the glass charge.

Thus the oscillating movement of the oscillating segment gear 68 is imposed on the uniform rotation imparted to the shaft 67 from the driven sprocket 57, producing an additive or retractive effect upon the rotation of the shaft depending upon the direction of movement of the segment 68. In this manner the continuous rotation of the shaft may be maintained but its angular velocity varied as determined by the shape of the cam 73 producing as desired a pulsating continuous rotation or a vibratory oscillating continuous rotation. Obviously by preventing rotation of the sprocket 57, the movement of the shaft as determined by the oscillating segment gear 68 will be oscillatory.

Suitable mechanism, (not shown) either mechanical or pneumatic, may be timed with the driving mechanism for the operation of the shears for severing the pulsating glass stream into separate gobs for use in a glassware forming machine. The particular construction and type of shears and operating mechanism not being shown as these are well known to those skilled in the art.

A modified form of the invention is illustrated in Figs. 12 and 13 wherein a metal shell 46 contains a refractory bowl 47. The top of the bowl is partially closed by means of cover blocks 48 above which is adjustably mounted a support 49. This support may be turned when desired by manual means and adjusted vertically by means of screws 50 (see Figs. 12 and 13). Supported by the supporting plate 49 is a sleeve 51 preferably of refractory material which has an opening 52 (see Fig. 13) through one side for the admission of the molten glass. The bottom of the bowl is preferably flat in the portion immediately under the sleeve 51 so that the admission of glass is confined to the opening 52. The runner shown in detail in Figs. 14 and 15 constitutes a finished portion 53 for engagement by the clamp 8. A shank portion 54 and a nose portion 55, the latter being adapted during its rotation over the orifice to exert a positive pressure in the glass confined between the sleeve 51 and the bottom of the tank, to extrude the glass through the orifice 56. This construction gives intensified action over the design shown in Figs. 1, 2, and 3, and permits greater adjustment of the extrusion and retraction by means of the rotatably adjustable sleeve 51 so as to bring the inlet orifice 52 either nearer or farther from the orifice 56.

As previously stated, the impellers shown in Figs. 1, 2, 3, 8, 9, 12, 13, 14, and 15 may be operated with a continuous rotary motion. In this case that portion of the driving mechanism shown in Fig. 4 may be clamped or locked against movement, or otherwise rendered inoperative, so that the driving force is wholly from the sprocket 57. In such case the shear timing mechanism can advantageously be operated by a suitable device attached to the shaft 67.

When it is desired to change or vary the angular velocity of the impeller, motion of the impeller will be to the right as viewed in Figs. 1, 2, 3, 12, and 13 when the shaft 74 is stationary. When the shaft 74 revolves as indicated, an angular motion will be imparted to the yoke 65 which will result in an angular motion as indicated by the dot-dash arrow 75 Fig. 5. According to the design of the cam 73 this angular motion may be much greater than the angular motion of the sprocket 57 and a reversal in the direction of the impeller will result. Continued motion of the cam 73 will effect a return of the sector gear 68 and a reversal of direction of the yoke 65, in which case the rotation of the impeller to the right will be increased. It is evident that in many cases the motion imparted to the impeller by the cam 73 and its related parts will be sufficient for satisfactory operation of the impeller without the motion from the sprocket 57.

In using the impeller of the type shown in Figs.

6, 7, 10 and 11 it is evident that the impeller will be driven to the right for a certain period of time, will reverse and be driven to the left during part of the motion of cam 73, and then will return to its initial direction. During rotation to the right, retraction of the glass in the orifice will occur and during rotation in the opposite direction, extrusion of the glass through the orifice will take place. The intensity of action will depend upon the speed of angular rotation of the impeller which can be varied as desired, depending upon the design of the cam 73, sector gear 68 and pinion 66. Further regulation of the action of the impeller is provided by the adjustment of the angular relation of the impeller to the vertical as well as the adjustment of the distance between the bottom of the impeller and the bowl as previously stated.

While I have elected to show the cam operated in a motor driven drive for purposes of illustration, it is to be understood that I do not wish to confine myself to such means, it being possible to accomplish this drive by means of air cylinders and the like.

It is evident from the foregoing description that the alternate waves of compression and retraction are due to the resistance of the viscous fluid resting on the bottom of the bowl and that the pressure wave varies approximately from a maximum at the periphery of the impeller to zero at its center and is negative on the opposite side of the impeller axis. Further, the enclosure around the impeller is such that no pocketing of a portion of the glass is possible as is the case with the well known plunger type of feeding device and also the enclosures of the runner must be so shaped that the motion of the runner may be continuous in either angular direction. Also as stated above the glass in the bowl is so confined by the relative dimensions of the impeller and nose of the bowl, as to prevent the leakage of pressure on the grass by the impeller.

It is further evident that but a slight modification to the shape of the bowl is necessary in order that an impeller with more than one thick section can be used to feed more than one orifice, and further that the design disclosed in Figs. 6 and 7 could be modified so as to permit two orifices to be used on opposite sides of the bottom of the bowl, the axis of the impeller in such case being tilted away from the source of supply of molten glass. Such modifications may be made and are contemplated without exceeding the scope of my invention.

Having described one illustrative embodiment of my invention, I claim as new:

1. Apparatus for delivering charges of molten glass, in combination, a receptacle for the supply of molten glass provided with a discharge outlet therefore, an impeller continuously presenting a moving surface above said outlet and mounted within said receptacle non-axially with respect to said outlet and overlying said outlet, means to rotate said impeller about its axis, and means for confining the glass under pressure of said impeller from leakage except through said outlet, said moving surface of the impeller having different portions which respectively are formed so that the rotation of the impeller about its axis will cause an extrusive impulse and subsequently a retractive impulse on the glass at the outlet.

2. Apparatus for delivering charges of molten glass according to claim 1 characterized in that the rotative movement imparted to the impeller is of uniform continuous character.

3. Apparatus for delivering charges of molten glass according to claim 1 characterized in that the rotative movement imparted to the impeller is of a non-uniform continuous character.

4. Apparatus for delivering charges of molten glass according to claim 1 characterized in that the rotative movement imparted to the impeller is of vibratory oscillating continuously rotating character.

5. Apparatus for delivering charges of molten glass according to claim 1 characterized in that the rotative movement imparted to the impeller is of an oscillatory character.

6. Apparatus for delivering charges of molten glass, in combination, a receptacle for the supply of molten glass having a submerged outlet, a rotary impeller mounted within said receptacle on an axis displaced from the axis of said outlet, said impeller continuously presenting a moving surface above said outlet and having pressure areas adapted to overlie said outlet and confine molten glass between said areas and the bottom of said receptacle, and means for imparting rotative movement to said impeller.

7. Apparatus for delivering charges of molten glass, in combination, a receptacle for the supply of molten glass having a submerged outlet, a rotary impeller mounted within said receptacle on an axis displaced from the axis of said outlet, said impeller continuously presenting a moving surface above said outlet and having pressure areas adapted to overlie said outlet and confine molten glass between said areas and the bottom of said receptacle, means for adjusting the impeller vertically within said receptacle, and means for imparting rotative movement to said impeller.

8. Apparatus for delivering charges of molten glass, in combination, a receptacle for the supply of molten glass having a submerged outlet, a rotary impeller mounted within said receptacle on an axis displaced from the axis of said outlet, said impeller providing a continuous surface of revolution having pressure areas adapted to overlie said outlet and confine molten glass between said areas and the bottom of said receptacle, means for adjusting the angular position of the impeller with respect to said outlet, and means for imparting rotative movement to said impeller.

9. A glass feeding device, in combination, a receptable for the supply of molten glass, having a submerged outlet, a rotating member immersed in the glass and having a surface thereof at all times overlying said outlet, and means whereby the rotation of said member causes a pressure wave to travel in the glass around the axis of rotation of said member, the outlet for said receptacle being non-axial with respect to said member, so that the alternate compression and contraction due to the pressure wave causes pulsation in the stream of glass issuing from said outlet.

10. A device for feeding glass charges comprising a receptacle for the molten glass having a discharge outlet in its bottom, an impeller rotating in said receptacle and having a surface thereof at all times overlying said outlet, the walls of said receptacle cooperating with said impeller to provide a confining chamber below the impeller and receptacle bottom of varying cross section, whereby rotary motion of said impeller causes varying pressures on the confined glass to extrude said glass through said outlet in a pulsating stream.

11. A device for feeding molten glass comprising a container for the glass, having an outlet therefor, a submerged impeller for imparting motion to the glass, said impeller being mounted upon said outlet and sealing the glass above and around said outlet from the hydrostatic pressure of the glass in said container, means for supplying glass to the container, means for imparting oscillatory rotary motion to the impeller, and means for adjusting the angular relation of the axis of the impeller with the surface of the bottom of the container.

12. The combination of a container for molten glass having an outlet in the bottom thereof, means for supplying molten glass to the container, an impeller capable of rotary motion immersed in the glass, a mechanism for imparting an oscillatory motion to said impeller and means for raising and lowering said impeller without interrupting its oscillatory motion, the outlet being located between the axis of rotation of the impeller and the side walls of the container.

13. In a glass feeding device the combination of a container for molten glass having an outlet in the bottom thereof, means for supplying molten glass to the container, an impeller capable of rotary motion immersed in the glass, the outlet being located between the wall of the container and the axis of rotation of the impeller, means for imparting to said impeller a rotation which can vary in direction and speed, means for raising and lowering said impeller without interrupting its rotary motion, and means for altering the position of the axis of rotation of said impeller with respect to the vertical without interrupting its rotary motion.

14. In a glass feeding device the combination of a container for molten glass having an outlet in the bottom thereof, means for supplying molten glass to the container, an impeller capable of rotary motion immersed in the glass, the outlet being located between the side wall of the container and the axis of rotation of said impeller, a mechanism for rotating said impeller at a periodically varying speed, means for raising and lowering said impeller without interrupting its rotation, a sleeve surrounding the impeller, means for raising and lowering said sleeve without interrupting the rotation of said impeller, and said impeller having a shank of substantially cylindrical shape having at its lower end an offset portion adapted to create a pressure wave in the glass contained in the space between said impeller and said sleeve.

15. The method of delivering charges of molten glass from an outlet of a glass containing receptacle which consists in supplying glass to a confining chamber of varying cross section within said receptacle, maintaining the glass in said confining chamber free from hydrostatic pressure of the glass in said receptacle, and relatively moving the confining surfaces of said chamber to impose alternate positive and negative pressures on the confined glass therein, to cause extrusion of the glass through said outlet in a pulsating stream.

16. The method of delivering charges of molten glass from an outlet of a receptacle containing a supply of glass, which consists in supplying molten glass to a confining chamber above said outlet, maintaining the glass in said confining chamber free from hydrostatic pressure of the glass in said receptacle and relatively moving certain of the confining surfaces of said chamber at a varying rate to impose on said confined glass alternate positive and negative pressures to extrude said glass through said outlet in a pulsating stream.

17. Apparatus for delivering charges of molten glass from an outlet of a receptacle containing a supply of molten glass, of means within said receptacle for confining a supply of glass and sealing said glass against hydrostatic pressure of the glass in said receptacle, and means for relatively moving said confining means to impose on the confined glass alternate positive and negative pressures to cause extrusion of said glass through said outlet in a pulsating stream.

18. Glass feeding apparatus comprising, in combination, a receptacle to contain molten glass, said receptacle having a discharge outlet in the bottom thereof, a movable regulator submerged in the glass in the receptacle and including a continuous surface overlying said outlet and adapted to free the glass below said surface of hydrostatic pressure of glass within said receptacle and automatic means to move portions of said regulator in a circular path periodically over said outlet to exert positive pressure upon the glass in the region of said outlet to expell a glass charge through said outlet followed by the application of a negative pressure upon the glass above the outlet to retract the portion of glass in the outlet into said receptacle.

19. Glass feeding apparatus comprising, in combination, a receptacle to contain molten glass, said receptacle having a discharge outlet in the bottom thereof, a movable regulator submerged in the glass in the receptacle and including a continuous surface overlying said outlet and adapted to free the glass below said surface of hydrostatic pressure of glass within said receptacle, shearing means for the glass below the outlet, and automatic means to move portions of said regulator in a circular path over said outlet to force a quantity of glass through said outlet under pressure, means to operate said shearing means in timed relation to the movement of said regulator to shear the mass of glass extruded through said outlet and form a mold charge, and means effective by the movement of said regulator for applying negative pressure on the glass in said outlet effective to retract the sheared end of said glass upwardly into the receptacle.

20. Glass feeding apparatus comprising, in combination, a receptacle to contain molten glass, said receptacle having a discharge outlet in the bottom thereof, a movable regulator completely submerged in the glass in said receptacle and having an upper plain surface of revolution, shearing means for the glass below the outlet, and automatic means to move portions of said regulator in a circular path over said outlet to force a quantity of glass through said outlet under pressure, means to operate said shearing means in timed relation to the movement of said regulator to shear the mass of glass extruded through said outlet and form a mold charge, and means effective by the movement of said regulator for applying negative pressure on the glass in said outlet effective to retract the sheared end of said glass upwardly into the receptacle.

21. Glass feeding apparatus comprising, in combination, a receptacle for molten glass having a submerged orifice through which glass is delivered, a rotatable regulator mounted in said receptacle immediately adjacent to said orifice and effective to free the glass adjacent and surrounding said orifice from hydrostatic pressure of glass in said receptacle, means for moving said regulator in a circular path in one direction to force molten glass through said orifice and form a suspended gob, means for shearing said gob and means for moving said regulator in the reverse direction to retract the severed stub into the receptacle.

22. Glass feeding apparatus comprising, in combination, a receptacle for molten glass having a submerged orifice through which glass is delivered, a rotatable regulator formed with a plain surface of revolution mounted in said receptacle immediately adjacent to said orifice and effective to free the glass adjacent and surrounding said orifice from hydrostatic pressure of glass in said receptacle, means for moving said regulator in a circular path in one direction to force molten glass through said orifice and form a suspended gob, means for shearing said gob and means for moving said regulator in the reverse direction to retract the severed stub into the receptacle.

23. The combination of a container for molten glass having an outlet in the bottom thereof, a regulator immersed in said glass for controlling the issuances of glass through said outlet to form suspended mold charges of molten glass, means for imparting an oscillating movement of revolution to said regulator, said regulator having a surface of revolution effective during movement in one direction to cause issuance of said glass through said outlet under pressure and form a suspended gob, and during movement in the reverse direction to cause retraction of a sheared stub into said receptacle, and means for shearing the suspended gob in a plane below the outlet.

24. The combination of a container for molten glass having an outlet in the bottom thereof, a regulator immersed in said glass for controlling the issuances of glass through said outlet to form suspended mold charges of molten glass, means for imparting to said regulator a motion of revolution about an axis inclined with respect to the axis of said outlet, said regulator having a surface of revolution effective to effect issuance of said glass through said outlet to form a suspended gob and thereafter to apply negative pressure on the glass immediately above the outlet to retract the glass therein into the receptacle, and means for varying the angular adjustment of the axis of rotation of said regulator to vary the size and shape of the suspended gob.

25. The combination of a container for molten glass having an outlet in the bottom thereof, a regulator immersed in said glass for controlling the issuances of glass through said outlet to form suspended mold charges of molten glass, means for imparting an oscillating movement of revolution to said regulator, said regulator having a surface of revolution effective during movement in one direction to cause issuance of said glass through said outlet under pressure and form a suspended gob, and during movement in the reverse direction to cause retraction of a sheared stub into said receptacle and means for variably controlling the size and shape of the suspended gob by variably controlling the period and speed of oscillation of said regulator.

26. In a glass feeder, in combination with a glass melting tank and a forehearth in communication therewith, said forehearth being provided with a semi-circular front end and having an orifice in the bottom thereof through which molten glass is issued to form suspended gobs of molten glass, a submerged regulator rotatably mounted in said forehearth overlying said outlet and in close proximity to the walls of the semi-circular front of said forehearth to free the glass above the outlet from hydrostatic pressure of the glass in said forehearth, the surface of said regulator adjacent said outlet being a continuous surface of revolution adapted during movement in a circular path above said outlet to alternately force the glass through said outlet ready for shearing and retract the sheared end into said forehearth.

27. In a glass feeder, in combination, with a glass melting tank and a forehearth in communication therewith, said forehearth being provided with a semi-circular front end and having an orifice in the bottom thereof through which molten glass is issued to form suspended gobs of molten glass, a submerged regulator rotatably mounted in said forehearth overlying said outlet and in close proximity to the walls of the semi-circular front of said forehearth to free the glass above the outlet from hydrostatic pressure of the glass in said forehearth, the surface of said regulator adjacent said outlet being provided with oppositely sloping surfaces connected to form a continuous surface of revolution adapted during movement in a circular path above said outlet to alternately force the glass through said outlet ready for shearing and retract the sheared end into said forehearth.

28. In a glass feeder, in combination with a glass melting tank and a forehearth in communication therewith, said forehearth being provided with a semi-circular front end and having an orifice in the bottom thereof through which molten glass is issued to form suspended gobs of molten glass, a submerged regulator rotatably mounted in said forehearth overlying said outlet and in close proximity to the walls of the semi-circular front of said forehearth, to free the glass above the outlet from hydrostatic pressure of the glass in said forehearth, the surface of said regulator adjacent said outlet having an angularly extending surface forming a continuous surface of revolution, adapted during opposite movements in a circular path above said outlet to alternately force glass through said outlet ready for shearing and retract the sheared end into said forehearth.

29. In a glass feeder, in combination with a glass melting tank and a forehearth in communication therewith, said forehearth being provided with a semi-circular front end and having an orifice in the bottom thereof through which molten glass is issued to form suspended gobs of molten glass, an impeller rotatably mounted in said forehearth coaxially therewith and overlying the said outlet; said impeller being of a size sufficient to extend close to the walls of said forehearth adjacent said outlet to seal the glass immediately above the outlet from the glass above the impeller, there being provision for free access of molten glass under said impeller from the side opposite said outlet, the lower face of said impeller having opposite sloping faces connected to form a continuous surface of revolution adapted during movement to alternately apply positive and negative pressures on the glass immediately above said outlet.

30. In a glass feeder, in combination with a glass melting tank and a forehearth in communication therewith, said forehearth being provided with a semi-circular front end and having an orifice in the bottom thereof through which molten glass is issued to form suspended gobs of molten glass, an impeller rotatably mounted in said forehearth coaxially therewith and overlying the said outlet, said impeller being of a size sufficient to extend close to the walls of said forehearth adjacent said outlet to seal the glass immediately above the outlet from the glass above the impeller, there being provision for free access of molten glass under said impeller from the side opposite said outlet, means for rotating said impeller in one direction to cause extrusion of glass through the outlet and in the opposite direction to cause retraction of the glass from the outlet into the forehearth.

31. In a glass feeder, in combination with a glass melting tank and a forehearth in communication therewith, said forehearth being provided with a semi-circular front end and having an orifice in the bottom thereof through which molten glass is issued to form suspended gobs of molten glass, an impeller rotatably mounted in said forehearth coaxially therewith and overlying the said outlet, said impeller being of a size sufficient to extend close to the walls of said forehearth adjacent said outlet to seal the glass immediately above the outlet from the glass above the impeller, there being provision for free access of molten glass under said impeller from the side opposite said outlet, means for rotating said impeller in one direction to cause extrusion of glass through the outlet and in the opposite direction to cause retraction of the glass from the outlet into the forehearth, and means for variably controlling the duration and speed of movement of the impeller in opposite directions.

32. In a glass feeder, in combination with a glass melting tank and a forehearth in communication therewith, said forehearth being provided with a semi-circular front end and having an orifice in the bottom thereof through which molten glass is issued to form suspended gobs of molten glass, an impeller rotatably mounted in said forehearth coaxially therewith and overlying the said outlet, said impeller being of a size sufficient to extend close to the walls of said forehearth adjacent said outlet to seal the glass immediately above the outlet from the glass above the impeller, there being provision for free access of molten glass under said impeller from the side opposite said outlet, means for rotating said impeller about an axis inclined from the vertical in one direction to cause extrusion of glass through the outlet and in the opposite direction to cause retraction of the glass from the outlet into the forehearth.

33. The method of forming and feeding a mold charge of molten glass from a receptacle containing a supply of molten glass having a submerged outlet through which the glass charge is issued, which consists in confining a quantity of glass in the receptacle above and surrounding the outlet free from hydrostatic pressure of the glass in the receptacle, and controlling the issuance of the confined glass through said outlet by a rotating implement to apply alternately positive and negative pressure on the glass immediately adjacent said outlet.

34. The method of forming and feeding a mold charge of molten glass from a receptacle containing a supply of molten glass having a submerged outlet through which the glass charge is issued, which consists in confining a quantity of glass in the receptacle above and surrounding the outlet free from hydrostatic pressure of the glass in the receptacle, and controlling the issuance of the confined glass through said outlet by a rotating implement to apply a positive pressure on the glass immediately adjacent said outlet to force the glass through said outlet to form a suspended gob, shearing said suspended gob and immediately applying negative pressure on the glass above said outlet to retract the sheared stub into the receptacle.

35. The method of forming and feeding a mold charge of molten glass from a receptacle containing a supply of molten glass having a submerged outlet through which the glass is issued, which consists in normally maintaining the glass in the receptacle above and immediately surrounding the outlet free from hydrostatic pressure of the glass in the receptacle, and causing, by a surface of revolution, alternate positive and negative pressures upon the glass above the outlet to cause said glass to issue from said outlet in the form of a suspended gob when it is sheared followed by an immediate retraction of the sheared stub during periods of negative pressure.

36. The method as defined by claim 35 characterized by controlling the shape of the suspended gob by the speed and extent of movement of the surface of revolution.

37. In the art of feeding glass charges in suspended gob form from a receptacle containing a freely flowing supply of molten glass and provided with a submerged discharge outlet, the feeding being controlled by the adhesive action of glass on a moving surface of revolution, as distinguished from the displacement action of plungers or the like, the method which consists in establishing a surface of revolution in the glass above said outlet alternately to establish a positive pressure on the glass immediately above the outlet to cause the glass to be extruded through said outlet in suspended gob form ready for shearing, and then changing the character of surface of revolution to apply negative pressure on the glass above the outlet and retract the sheared stub from said outlet, while maintaining such glass and stub sealed against hydrostatic pressure of the glass within said receptacle.

38. In the art of feeding glass charges in suspended gob form from a receptacle containing an unrestricted supply of molten glass and having a submerged discharge outlet, the feeding being controlled by the adhesive action of glass on a moving surface of revolution, as distinguished from the displacement action of plungers and the like; the method which consists in confining a body of glass immediately above the outlet and substantially below the normal level of glass in the receptacle, between the bottom of the receptacle and a cooperating surface of revolution of a rotary impeller, and periodically altering the plane of the surface of revolution of the impeller to cause the glass first to be extruded through said outlet in suspended gob form ready for shearing and thereafter to retract the sheared stub into the receptacle while maintaining the glass immediately over and adjacent said outlet sealed from hydrostatic pressure of glass in said receptacle, and during said revolution of the impeller maintaining the glass in the upper portion of the receptacle free from turbulence and agitation.

JAMES BAILEY.